June 21, 1960 H. J. TYZZER 2,941,497
TUNING DIAL FOR ELECTRONIC INSTRUMENTS
Filed Dec. 17, 1957
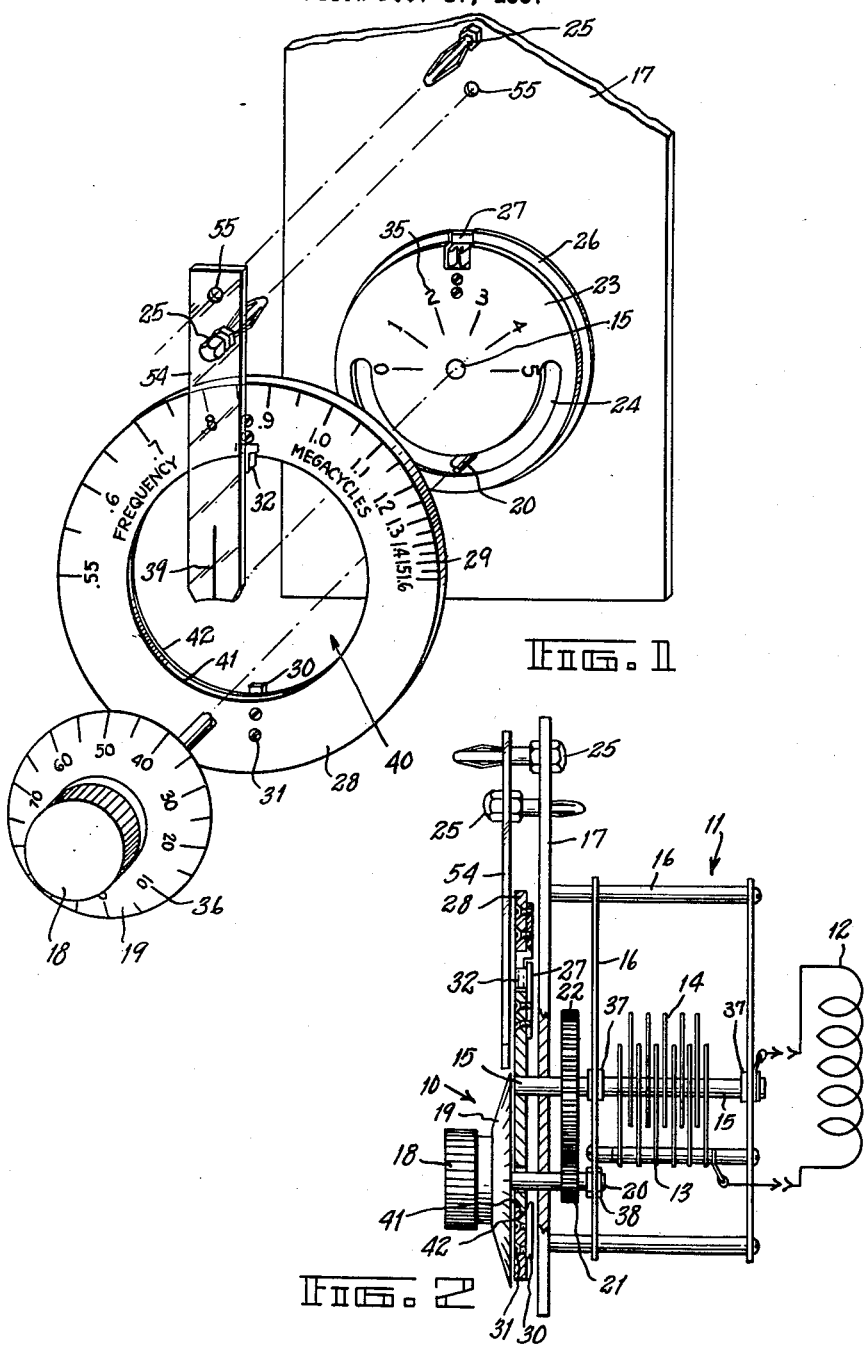
INVENTOR.
HOWARD J. TYZZER
BY Darby & Darby
HIS ATTORNEYS.

United States Patent Office 2,941,497
Patented June 21, 1960

2,941,497

TUNING DIAL FOR ELECTRONIC INSTRUMENTS

Howard J. Tyzzer, Mountain Lakes, N.J., assignor to Ferris Instrument Company, Boonton, N.J., a corporation of New Jersey Filed Dec. 17, 1957, Ser. No. 703,420

12 Claims. (Cl. 116—124.1)

This invention relates to an improvement in tuning dials for electronic instruments and the like and in particular to tuning dials for radio frequency signal generators.

In order to conserve space and facilitate operation it is common to provide radio frequency signal generators with a plurality of interchangeable coils, each associated with a particular frequency range or band, coupled to a common variable tuning condenser which is operated by a control associated with a dial indicator on which is calibrated the ranges or bands of each of the particular coils or combination of coils. The practice has been to place the scales representing the individual ranges in concentric circles or arcs on the dial, thereby seriously crowding the indicator with calibration marks as the number of coils or frequency ranges increase. In a device having many ranges, legibility is nearly always sacrificed due to the limited amount of space. Dials of this type are difficult to read, difficult to adjust and often inaccurate.

It is an object of this invention to provide a highly legible, easy reading and accurate tuning dial and indicator for radio frequency signal generators and similar electronic instruments.

An object of this invention is to provide a tuning dial wherein the calibrated scales indicating the particular range tuned are contained on a plurality of interchangeable rings selectively mounted about a manually operated tuning knob so that only the particular range used may be indicated to the exclusion of all of the other possible ranges of the generator.

It is yet another object of the invention to provide an improved tuning dial arrangement having a permanent knob and drive, with interchangeable calibrated scales suitable for use on different wave bands or frequency ranges, and particularly having simplified means for changing scales as may be desired.

A further object is to provide a dial that is easily manipulated and one in which the dial settings may be easily and accurately obtained and at a later time reset. Another object is to provide a dial for frequency signal generators that is economical to produce and simple in construction and operation. Still another object is to provide a dial arrangement easy to install and to change.

These and other objects of this invention, will become apparent from the following description and from the appended drawings illustrating this invention, in which:

Fig. 1 is an exploded perspective view of a preferred form of dial arrangement according to the invention, as mounted on the face of an instrument housing; and Fig. 2 is a vertical cross-sectional view of the device of Figure 1 showing the device of this invention in relationship to the instrument on which it is mounted.

As will be seen in the drawing, a tuning dial indicator 10 is provided for a variable tuning condenser 11 which is operatively connected to an instrument load 12. The load 12 contains a variety of components and appropriate circuitry and is here represented as a single coil only for the sake of convenience and simplicity. In a frequency signal generator of the type to which this embodiment is directed there is a number of frequency range coils, which are individually or cooperatively capable of being switched or plugged into the operating circuitry necessary to produce the desired frequency. The exact frequency is obtained by tuning the variable condenser 11.

The variable condenser 11, which is well known in the art, is formed in the usual manner by providing a series of fixed plates 13 and a series of cooperatively rotating plates 14. The plates 14 are mounted on a rotatable shaft 15 secured in bearings 37 located in a frame 16. The condenser structure 11 is mounted as a unit on the front panel wall 17 of the instrument with its rotating shaft 15 extending outwardly from the panel wall 17. A manually operated dial knob 18 having an indicator 19 is mounted on a second rotatable shaft 20 which extends through the panel wall 17 and seats in bearing 38 in the condenser frame 16. Mounted on shaft 20 is a spur gear 21 engaging a larger spur gear 22, which is similarly mounted on the condenser shaft 15, so that the knob 19 when manually rotated will cause the plates 14 also to rotate, at a reduced speed.

A rotatable indicator disk 23 having an arcuate opening 24 adjacent the lower part of its periphery is mounted at its center at the end of the condenser shaft 15 so that the tuning knob shaft 20 extends through the arcuate opening 24. The indicator disk 23 is fixed on the shaft 15 and will rotate together with the condenser plates 14 within an arc prescribed by the opening 24, which, as shown, preferably has an extent of the order of 180 degrees. This disk 23 is provided with a logging scale 35 indicating the number of complete rotations of the shaft 20, and the knob indicator 19 is provided with a vernier scale 36 so that together they may cooperate to provide an exact reading of the position the condenser 11 assumes. As the disk 23 and the knob 18 are in fixed rotating relationship with each other, this reading, when once found, can be easily duplicated by the operator of the instrument.

The disk 23 is formed with a flat flange extension 26 extending radially and around its periphery and has a female spring clip member 27 mounted at a suitable point along its periphery so that a flat annular ring 28 having a calibrated scale 29 on its face may be removably mounted on it.

The annular ring 28 is provided with a central aperture 40 and inner rims 41 and 42 conforming to the shape of disk 23 and flange 26 respectively so that when mounted it will substantially mate therewith. At the front face of ring 28 the inner rim 41 has a diameter substantially equal to that of the disk 23 and at the rear face of ring 28 the inner rim 42 is enlarged to have a diameter substantially equal to that of flange 26. An extension finger 30 and a male clip member 32 are secured by screws 31 or other suitable means, to the rear face of the ring 28 and extend inwardly of the inner rim 41 diametrically opposite of each other. In assembly, the ring 28 is slipped over knob 18 and disk 23, the tab finger 30 is inserted behind flange 26 and the male clip member 32 is inserted into the female clip member 27. In this manner, ring 28 may be easily slipped on and removed from the disk 23 as desired; yet when once mounted will be jointly rotatable with it.

A transparent fiducial or index marker 54 having a reference line 39 inscribed thereon, is removably mounted on the instrument panel 17. When in position, it extends over the ring 28 and disk 23 and has an end adjacent to the knob-indicator 19. Marker 54 provides a reference for the reading of all of the scales, either individually or cooperatingly, yet permits access to ring 28 for its removal. In this embodiment the index marker 54 is mounted on the panel wall 17 by means of a pair of spring plugs 25 of the form called "banana plugs," one secured on the marker 54 and the other to panel wall 17, and each fitting into a corresponding hole 55, in the other member. Other suitable means such as a thumb screw may be used with equal ease and result to removably secure the index marker 54 to the panel 17.

The calibrated scale 29 shown on the ring 28 has indicated thereon a frequency range from .55 to 1.6 megacycles which is for illustrative purposes only. It is obvious that a plurality of annular rings 28 may be provided, each containing range calibrations corresponding to only a particular operating band of the total range of the instrument, and capable of being interchangeably used as desired. In this manner a single tuning dial may be adapted to many frequency ranges or other uses without the limitations caused by any lack of space.

In the embodiment of this invention shown in the drawings the logging scale 35 of disk 23 and the vernier scale 36 of indicator 19 may singly or together be used with the calibrated scales of ring 28, or may be independently used to provide an exact reading for reference and recordation purposes without any direct relationship to the frequencies produced by the instrument, the calibration 29 of ring 28 then providing an indication of the frequency actually tuned.

It will be obvious from the foregoing specification and the drawings that this invention may not only be used in radio frequency generators but in any electronic instrument or device having a plurality of calibrated scales or ranges bearing some operative relationship to a single tuning dial, such as radio receivers, transmitters, measuring instruments and the like.

The present invention may also be used as a simple way of standardizing tuning or like indicators for a line of instruments having different ranges or calibrations. The knob 18 and disk 23 may be made the same for all instruments, while ring 28 need be made individually only for instruments of a certain range. This permits simple assembly and desirable conformity of parts. It is therefore to be understood that the foregoing description is merely illustrative, and that the invention is not to be limited by the foregoing specification, but is defined solely by the claims as appended hereto.

What is claimed is:

1. In an electrical instrument having variable components and a tuning mechanism with a rotatable tuning shaft, a dial and indicator assembly comprising, in combination: drive means for causing said shaft to rotate, a disk mounted on said tuning shaft and jointly rotatable therewith, an annular indicator ring calibrated correspondingly to the operation of said instrument, means for removably mounting said annular indicator ring on said disk to be jointly rotatable therewith without removing said drive means, and an index marker removably mounted on said instrument and associated with said mounted annular indicator ring whereby the operative position of said instrument may be determined.

2. In an electrical instrument having variable components and a tuning mechanism with a rotatable tuning shaft, a dial and indicator assembly comprising, in combination: drive means for rotating said tuning shaft, a disk mounted on said tuning shaft so as to be jointly rotatable therewith and having an annular flange projection along its periphery, an annular indicator ring calibrated in correspondence with the operation of said instrument, cooperative means mounted on said disk and and on said annular indicator ring for removably securing said annular indicator ring on said disk to be jointly rotatable therewith, and an index marker removably mounted on said instrument extending over said mounted annular indicator ring and said disk and associated with said indicator calibrations, whereby the operative position of said instrument may be determined while permitting removal of said annular ring as desired.

3. In an electrical instrument having variable components and a tuning mechanism with a rotatable tuning shaft, a dial and indicator assembly comprising in combination: a second shaft extending parallel to said tuning shaft and coupled thereto for cooperative rotation at a different speed, a knob mounted on said second shaft for causing rotary movement thereto, a disk mounted on said tuning shaft so as to be jointly rotatable therewith and calibrated to indicate relative rotation of said shafts, said disk having an annular flange projecting along its periphery and a female clip receptacle mounted thereon, an annular ring having a central aperture conforming substantially in diameter to said disk and flange, said annular ring having secured to its inner edge a tab finger extendable behind said flange projection and a male clip member insertable in said clip receptacle, said annular indicator ring being calibrated correspondingly to the operation of said instrument, and an index marker removably mounted on said instrument and associated with said calibrations on said annular ring and said disk whereby the operative position of said instrument and the relative rotary movement of said shafts may be determined, while permitting the removal of said annular indicator ring.

4. In an electrical instrument having variable components and a tuning mechanism with a rotatable tuning shaft, a dial and indicator assembly comprising, in combination: a second shaft extending parallel to said tuning shaft and coupled thereto for cooperative rotation at a greater speed, a vernier calibration indicator knob mounted on said second shaft for causing rotary movement thereto, a flat disk mounted on said tuning shaft and jointly rotatable therewith, said disk having calibrations inscribed thereon indicating the relative number of complete rotations of said knob, said disk having an annular flange projecting along its periphery and a resilient female spring clip receptacle mounted at a point along its periphery, an annular indicator ring having a central aperture substantially conforming in diameter to said disk and said flange, said annular indicator ring having calibrations inscribed on its front face corresponding to the operation of said instrument, said ring also having a tab finger extendable behind said flange projection and a male clip member insertable in said spring clip receptacle, whereby said ring may be removably mounted on said disk, an index marker removably mounted on said instrument and extending over said annular ring and said disk, and having an end adjacent said knob, said index marker when assembled being associated with said calibrations inscribed on said ring, disk and knob, whereby the operative position of said instrument and the relative rotary movement of said shafts can be determined while permitting said annular ring to be removed from said tuning shaft.

5. In an electrical instrument having variable components and a tuning mechanism with a rotatable tuning shaft, a dial and indicator assembly comprising, in combination: a second shaft extending parallel to said tuning shaft and coupled thereto for cooperative rotation at a greater speed, a vernier calibrated indicator knob mounted on said second shaft for causing rotary movement thereof, a disk calibrated to indicate the relative number of rotations of said knob mounted on said tuning shaft and jointly rotatable therewith, said disk having an arcuate opening adjacent to its periphery through which said second shaft extends, so that rotation of said disk and tuning shaft may be prescribed by the limits of said arcuate opening, said disk having an annular flange projecting along its periphery and a resilient female spring clip receptacle mounted at a point along its periphery, an annular indicator ring having a central aperture substantially conforming in diameter to said disk and said flange, said annular indicator ring having calibrations inscribed on its front face corresponding to the operation of said instrument, and said ring also having a tab finger extendable behind said flange projection and a male clip member insertable in said spring clip receptacle, whereby said ring may be removably mounted on said disk, an index marker removably mounted on said instrument and extending over said annular ring and said disk, and having an end adjacent said knob, said index marker when assembled being associated with said calibrations inscribed on said ring, disk and knob, whereby the operative position of said instrument and the relative rotary movement of said shafts can be determined while permitting said annular ring to be removed from said tuning shaft.

6. In an electrical instrument having variable components operating over a number of ranges and a tuning mechanism having a rotatable tuning shaft, a dial and indicator assembly comprising, in combination: means for rotating said tuning shaft, a plurality of substantially identical annular disks each having calibrations inscribed thereon corresponding to a particular one of said operating ranges, means mounted on said tuning shaft for removably mounting one of said annular disks, said annular disks being interchangeably mountable on said tuning shaft by said mounting means in accord with the particular desired range of operation of said instrument, and an index marker associated with said mounted annular disk whereby the operative position of said instrument may be determined.

7. In an electrical instrument having variable components operating over a number of ranges and a tuning mechanism having a rotatable tuning shaft, a dial and indicator assembly comprising, in combination: means for causing said tuning shaft to rotate, a disk mounted on said tuning shaft so as to be jointly rotatable therewith, a plurality of substantially identical flat annular indicator rings each having calibrations inscribed thereon corresponding to a particular one of said operating ranges, means mounted on said disk for removably mounting one of said annular rings, said annular ring being interchangeably mountable on said disk by said mounting means in accord with the particular desired range of operation of said instrument, and an index marker associated with said annular disk whereby the operative position of said instrument may be determined.

8. In an electrical instrument having variable components operating over a number of ranges and a tuning mechanism having a rotatable tuning shaft, a dial and indicator assembly comprising, in combination: a disk mounted on said tuning shaft so as to be jointly rotatable therewith and having an annular flange projection along its periphery and a resilient female clip receptacle mounted at a point thereon, a plurality of substantially identical flat annular indicator rings interchangeably mountable on said disk, each of said annular indicator rings having calibrations inscribed thereon corresponding to a particular one of said operating ranges, each ring having a tab finger extendable behind said flange projection, and a male clip member insertable in said female clip receptacle, said annular ring being interchangeably mountable on said disk in accord with the particular desired operating range of said instrument, and an index marker removably mounted on said instrument and associated with said mounted ring whereby the operative position of said instrument may be determined.

9. In an electrical instrument having variable components operating over a number of ranges and a tuning mechanism having a rotatable tuning shaft, a dial and an indicator assembly comprising, in combination: a second shaft extending parallel to said tuning shaft and coupled thereto for cooperative rotation at a greater speed, a vernier-calibrated indicator knob mounted on said second shaft for causing rotary movement thereof, an indicator mounted on said tuning shaft so as to be jointly rotatable therewith and calibrated to indicate the relative number of complete rotations of said knob, said indicator comprising a flat disk having an annular flange projection along its periphery and a resilient female clip receptacle mounted at a point thereon, a plurality of further indicators each calibrated in correspondance with a particular one of said operating ranges of said instrument, each of said further indicators comprising a flat annular ring having a central aperture conforming in diameter to said first indicators and having secured to its inner edge a tab finger extendable behind said flange projection and a male clip member insertable in said clip receptacle, each of said further indicators being removably mountable on said first indicator in accordance with the particular desired range of operation of said instrument, and an index marker mounted on said instrument extending over and associated with said mounted indicators, whereby the operative position of said instrument and the relative rotary movement of said shafts may be determined.

10. In an electrical instrument having variable components operating over a number of ranges and a tuning mechanism having a rotatable tuning shaft, a dial and indicator assembly comprising, in combination: a second shaft extending parallel to said tuning shaft and coupled thereto for cooperative rotation at a greater speed, a vernier calibrated knob-indicator mounted on said second shaft for causing rotary movement thereof, a second indicator mounted on said tuning shaft so as to be jointly rotatable therewith and calibrated to indicate the relative number of complete rotations of said knob-indicator, said second indicator comprising a flat disk having an annular flange projection along its periphery, a resilient female clip receptacle mounted at a point thereon, and an arcuate opening adjacent its periphery through which said second shaft extends so that the rotation of said second indicator and said tuning shaft may be prescribed by the limits of said arcuate opening, a plurality of third indicators each calibrated correspondingly to a particular one of said operating ranges of said instrument, each of said third indicators comprising a flat annular ring having a central aperture conforming in diameter to said disk and said flange and having secured to its inner edge a tab finger extendable behind said flange projection and a male clip member insertable in said clip receptacle, so as to be removably mountable on said second indicator in accord with the particular desired range of operation of said instrument, and an index marker mounted on said instrument extending over and associated with said mounted indicators whereby the operative position of said instrument and the relative rotary movement of said shafts may be determined.

11. In an instrument having variable components operating over a number of ranges and a selector mechanism for operating over these ranges having a rotatable shaft, a dial and indicator assembly comprising, in combination: means for rotating said shaft, a plurality of substantially identical disks each having calibrations inscribed thereon corresponding to a particular one of said operating ranges, means mounted on said shaft for removably mounting one of said annular disks, said annular disks being interchangeably mountable on said shaft by said mounting means in accord with the particular desired range of operation of said instrument, and an index marker associated with said mounted annular disk whereby the operative position of said instrument may be determined.

12. In an instrument having variable components and a tuning mechanism with a rotatable tuning shaft, a dial and indicator for assembly comprising, in combination: drive means for rotating said tuning shaft, a disk mounted on said tuning shaft so as to be jointly rotatable therewith, an indicator ring calibrated in correspondence with the operation of said instrument, cooperative means mounted on said disk and on said indicator ring for removably securing said indicator ring on said disk to be jointly rotatable therewith and an index marker removably mounted on said instrument and associated with said mounted indicator ring whereby the operative position of said instrument may be determined while permitting removal of said indicator ring as desired.

References Cited in the file of this patent
UNITED STATES PATENTS
2,772,353    Browder ------------- Nov. 27, 1956